June 28, 1955

C. P. WILLIAMS 2,712,106

MOTOR OPERATED POSITION CONTROL SYSTEM

Filed June 7, 1951

INVENTOR.
CHESTER P. WILLIAMS
BY
Harry M. Saragovitz
Attorney

June 28, 1955  C. P. WILLIAMS  2,712,106
MOTOR OPERATED POSITION CONTROL SYSTEM
Filed June 7, 1951  3 Sheets-Sheet 2

INVENTOR.
CHESTER P. WILLIAMS
BY
Harry M. Saragovitz
Attorney

June 28, 1955
C. P. WILLIAMS
2,712,106
MOTOR OPERATED POSITION CONTROL SYSTEM
Filed June 7, 1951
3 Sheets-Sheet 3
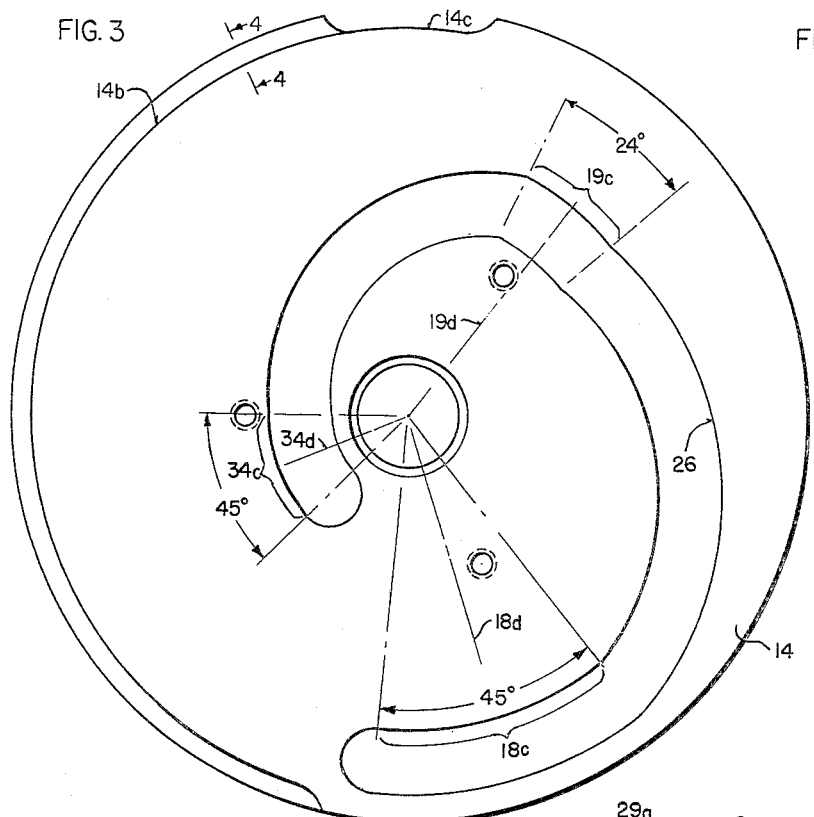
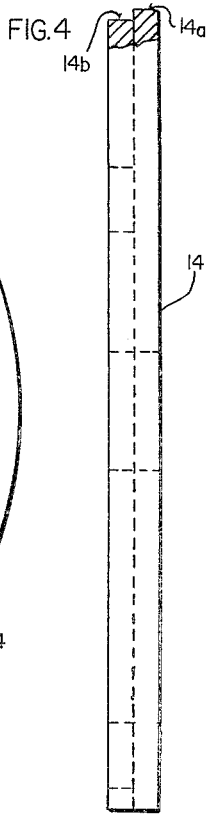
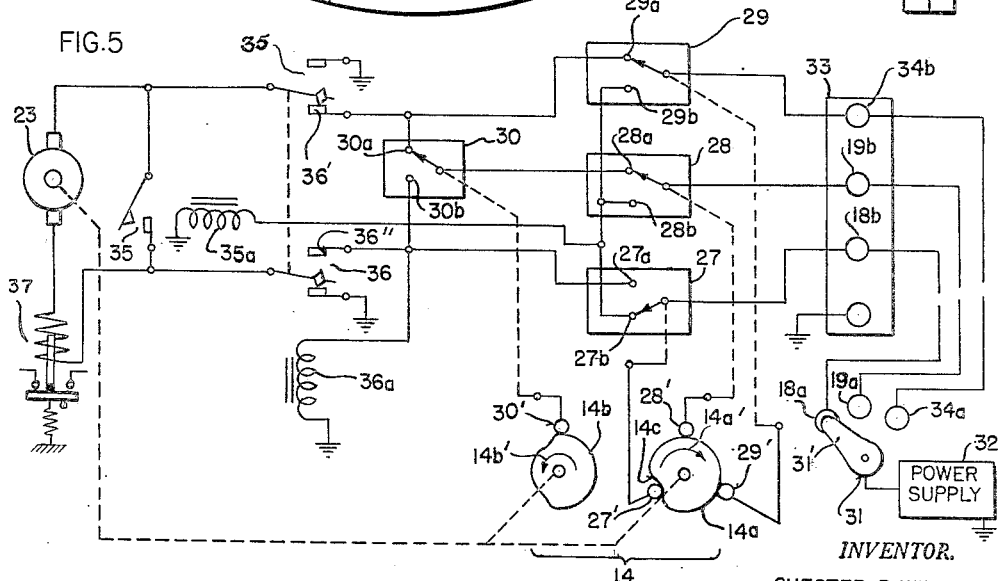
INVENTOR.
CHESTER P. WILLIAMS
BY
Harry M. Saragovitz
Attorney

United States Patent Office 2,712,106
Patented June 28, 1955

2,712,106

MOTOR OPERATED POSITION CONTROL SYSTEM

Chester P. Williams, Waltham, Mass., assignor to the United States of America as represented by the Secretary of the Army Application June 7, 1951, Serial No. 230,405

2 Claims. (Cl. 318—467)

This invention relates to improvements in control systems and apparatus therefor, and more particularly to remotely-controlled power-driven mechanism for causing movement of an element to any selected one of a number of definite and fixed positions.

A specific and important application of the present invention resides in its use for operating by remote control an antenna switch box of a conventional design to switch a coaxial cable radio-frequency transmission line to a selected one of a number of antenna connections. In this type of radio-frequency switching, it is a definite requirement not only that connection be made readily and quickly from any one to any other of the antenna connections, but that the common switching element for this purpose be and remain positioned accurately at the selected antenna connection. An example of a type of switch which might be remotely controlled by the improved mechanism described herein, is disclosed in Patent No. 2,427,940 issued September 23, 1947 to Jay Jesse Ayres.

Among the objects of the present invention is the provision of an improved control system and apparatus therefor which is capable of quickly changing the position of a switching or other element to any one of a number of other positions and with an accuracy of within .002 of an inch, either way, from the exact location or center-line of the new position.

Other objects and advantages will hereinafter appear.

For the purpose of illustrating the invention, an embodiment thereof is shown in the drawings, wherein:

Fig. 3 is a plan view of the cam disk in Fig. 1, looking toward the left in the latter;

Fig. 4 is an elevational view partly in section and looking toward the left in Fig. 3, the section being taken on line 4—4 in the latter; and Fig. 5 is a simplified schematic diagram illustrative of the operating action and showing the principal electrical and mechanical connections therefor.

Figure 1:
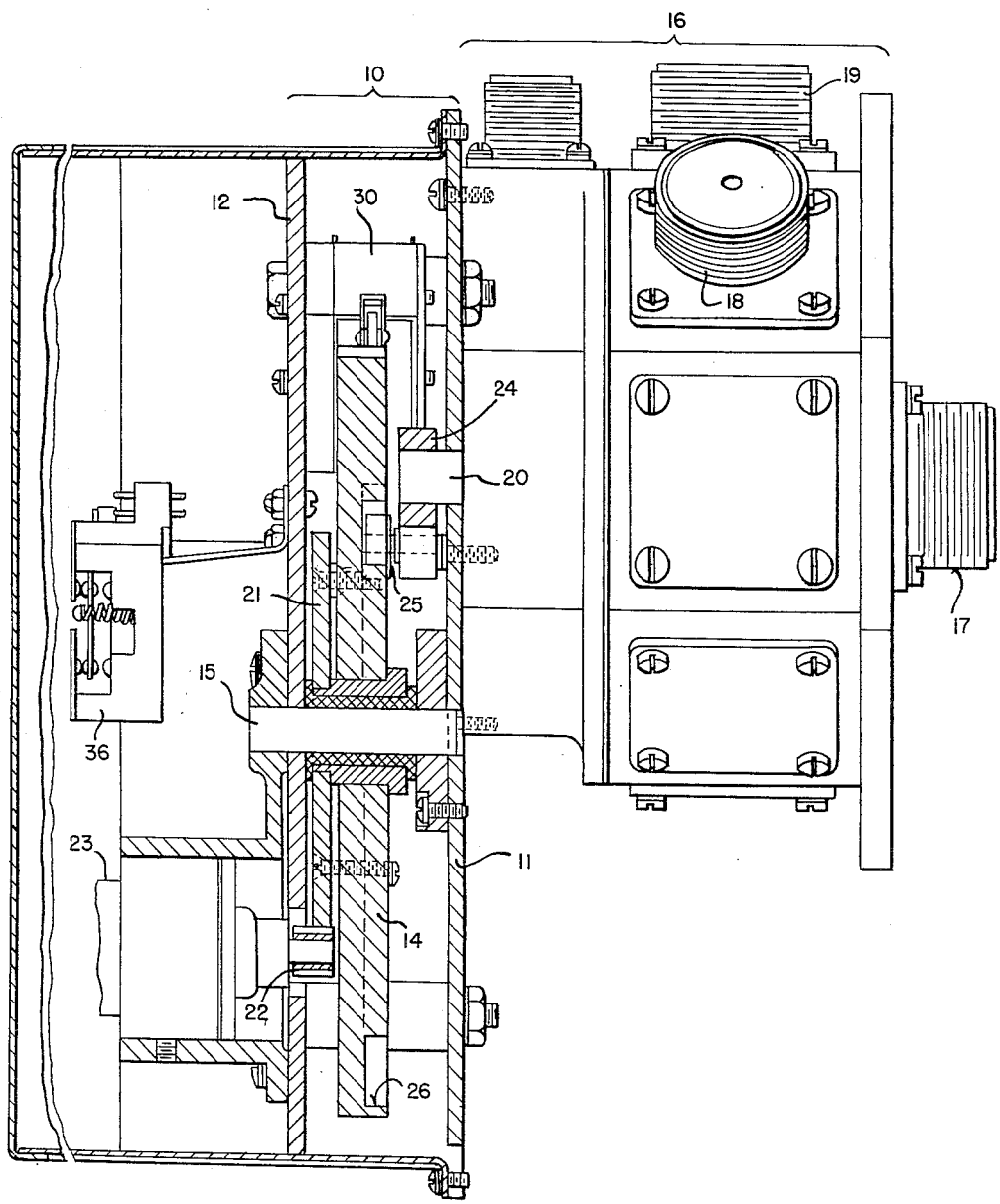
Figure 1 is a view partly in section and partly in elevation, of power-driven mechanism constructed and operating in accordance with the present invention and associated with an antenna switch box of a conventional design, the section being taken on the line 1—1 in Fig. 2 and some of the parts being removed for the sake of clarity.

In Fig. 1, the reference numeral 10 designates power-driven mechanism the respective parts of which are disposed and mounted as shown to constitute a drive box between the spaced plates 11 and 12 of which a cam disk 14 is mounted for rotary movement about a shaft 15.

Secured to the drive box 10 is an antenna switch box 16 of a conventional design to which a coaxial cable radio-frequency transmission line is connected at 17. Connections such as 18 and 19 are for coaxial lines leading to as many different antennas. Extending from the switch box 16 and through plate 11 into the drive box 10, is a central drive shaft 20 to which is fixed the rotor or switching element (not shown) for connecting the transmission line to any one of the antennas.

Fixed to one side of disk 14 is a gear 21 in mesh with a pinion 22 on the armature shaft of a direct-current motor 23.

The rotor or switching element in switch box 16 is the equivalent of the rotor X in the Ayres patent aforesaid, and by changing the position of the former, the transmission line coming in at 17 may be connected to any selected one of a number of antennas connected, respectively, to as many different connections 18 and 19 disposed about the axis of rotation of shaft 20. For this purpose, an arm 24 is fixed to shaft 20 and provided with a roller 25 received by a cam groove 26 in the adjacent face of disk 14.

Secured to plate 12 are microswitches 27, 28 and 29 the respective rollers 27', 28' and 29' of which press against and are always in contact with the peripheral cam surface 14a on the righthand side, as viewed in Fig. 4, of disk 14. Also secured to plate 12 is a microswitch 30 the roller 30' of which presses against and is always in contact with the peripheral cam surface 14b on the lefthand side, as viewed in Fig. 4, of disk 14.

For remote-control of the improved power-driven mechanism, a suitable switch such as 31 is connected as shown in Fig. 5, between a D. C. power supply 32 and a terminal strip 33. In operating switch 31, the arm or pole 31' thereof is first moved into position over the desired one of its contacts 18a, 19a and 34a, after which it is pressed into engagement with the selected contact to complete connection from power supply 32 to the corresponding connection 18b, or 19b, or 34b of terminal strip 33.

For the purpose of illustrating in a single figure the function of cam disk 14, it is considered in Fig. 5 as having been split in half in Fig. 4, with the half having the peripheral cam surface 14a laid over to the right, and with the half having the peripheral cam surface 14b laid over to the left. Although the two halves in Fig. 5 are actually integral as in Figs. 1 and 4, for the layout as in Fig. 5 the arrows 14a' and 14b' indicating respective directions of simultaneous rotary movement of the two halves of disk 14, are correctly shown pointed in opposite directions.

Mounted on plate 12 of drive box 10 are two relays 35 and 36, each of which is spring-biased to the respective, normal positions thereof shown in Fig. 5. In switching from any one of the antenna connections of switch box 16 to a selected one, power is applied to motor 23. Cam disk 14 is thereupon rotated in the proper direction and through a sufficient number of degrees to pivot or tilt cam-follower or arm 24 and place the switch element or rotor in switch box 16 at the new position to connect the transmission line at 17 with the particular antenna desired. When the new selected position of the switch element or rotor is reached, power is automatically cut off from motor 23 and the coil 35a of relay 35 is excited to close the latter and short the motor, for electric-braking action.

When the new position selected for the switch element or rotor of switch box 16 requires that the direction of rotary movement of cam disk 14 be opposite to what it was before, the coil 36a of the polarity-changing relay 36 is excited to reverse motor 23.

Figure 2:
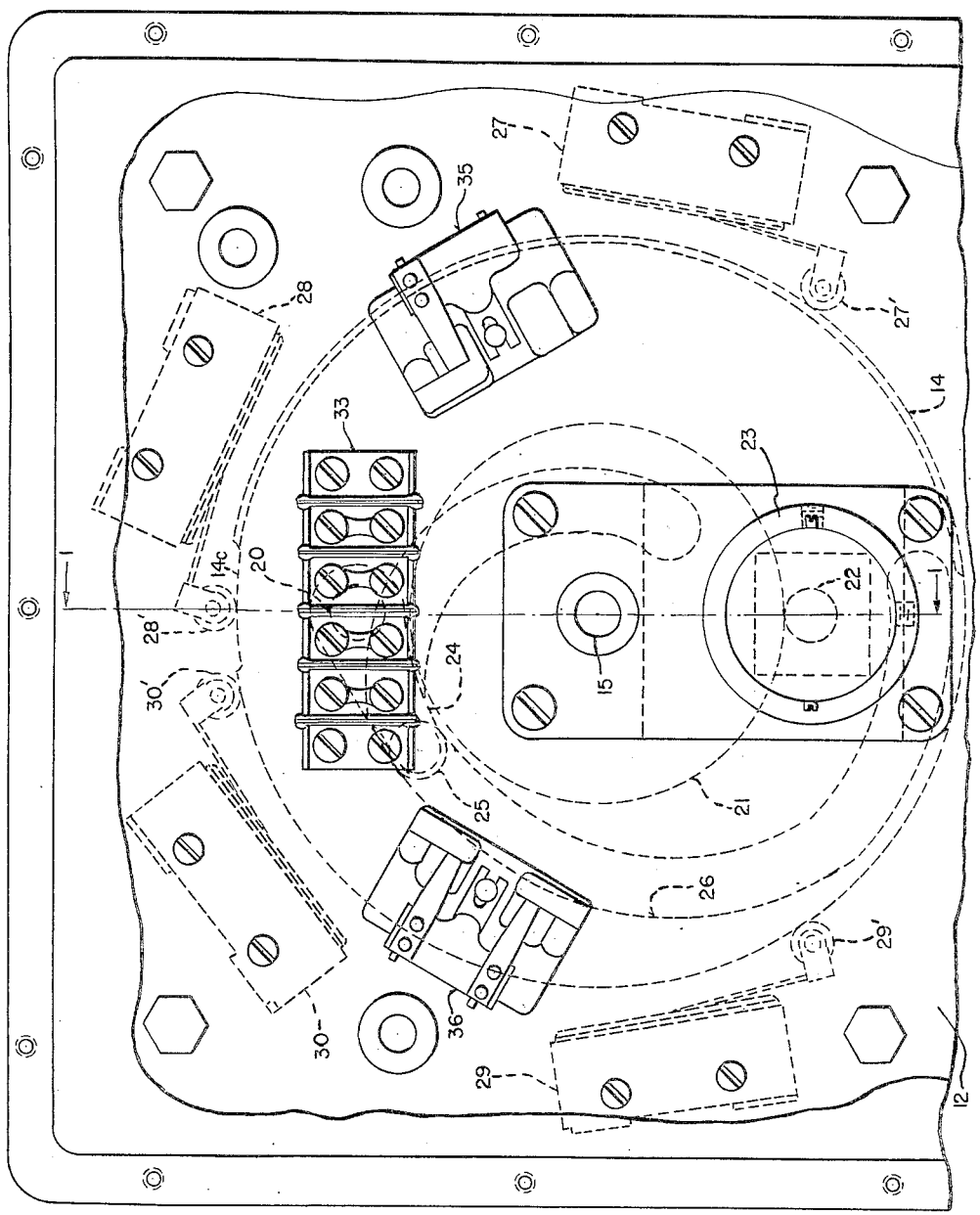
Fig. 2 is an elevational view, partly broken away, and looking toward the right in Fig. 1.

In the specific embodiment of the invention shown in Figs. 1, 2 and 5, the switch box 16 has the two antenna connections 18 and 19, and a third one (not shown) disposed on the far or other side of connection 19 and angularly spaced from the latter, the same as connection 18.

Each of the microswitches 27, 28, 29 and 30 functions as a single-pole, double-throw switch. The top contacts 27a, 28a, 29a and 30a are engaged when the respective rollers 27', 28', 29' and 30' are pressing against the high part or parts of the respective, peripheral cam surfaces 14a and 14b; whereas the bottom contacts 27b, 28b, 29b and 30b are engaged when these rollers are in or are pressing against the cut-away or low part or parts of the respective cam surfaces.

Prior to movement of the various parts to the respective positions thereof as shown in Fig. 5, switch arm 31', which is spring-biased to be normally out of engagement with any one of the contacts 18a, 19a and 34a, was moved over contact 18a and then pressed into engagement with the latter to operate motor 23. Disk 14 was then rotated until the cut-away or low part 14c of cam surface 14a coincided with roller 27' of microswitch 27. Contact 27a thereupon became disengaged to cut off motor 23, and contact 27b became engaged to excite solenoid 35a and close relay 35 to brake the motor. The angular disposition of cam groove 26 with respect to cam surface 14a is such that with roller 27' engaging the cut-away or low part 14c, roller 25 is somewhere in the concentric, 45° portion 18c of groove 26. In such case, the switching element or rotor in switch box 16 is lined up exactly with outgoing connector 18, thereby connecting the latter to the transmission line coming in at 17.

With disk 14 in the intermediate position thereof shown in Figs. 1 and 2, roller 25 is in the intermediate and concentric portion 19c of groove 26 to orient arm 24 at the precise angle for complete connection of the coaxial line or cable connected at 17, with the selected intermediate antenna connection 19. Rotation of disk 14 clockwise (counter-clockwise in Fig. 3) from the intermediate position thereof to place roller 25 in the concentric portion 18c of groove or slot 26, causes movement of roller 25 radially outward to orient arm 24 at the precise angle for complete connection of the coaxial line with the selected antenna connection 18. Rotation of disk 14 counter-clockwise (clockwise in Fig. 3) from the intermediate position thereof to place roller 25 in the concentric portion 34c of groove 26, causes movement of roller 25 radially inward to orient arm 24 at the precise angle for complete connection of the coaxial line with the third antenna connection aforesaid.

The accuracy with which each of the concentric portions 18c, 19c and 34c of groove 26 is machined or otherwise made in the face of disk 14, and the small tolerance allowed for the sliding fit of roller 25 in groove 26, is made to be within substantially .002 of an inch. Accordingly, the cam operation in the improved mechanism is capable of changing the position of the switching element or rotor in switch box 16 to any one of a plurality of radial locations and to position this element or rotor at each selected location with an accuracy sufficient to meet exacting requirements.

Another important feature or advantage is obtained by making each of the concentric groove-portions 18c and 34c extend through approximately 45° and by making the concentric groove-portion 19c extend through approximately 24°, as indicated in Fig. 3. Therefore, if the accuracy with which cam disk 14 is positioned is to within approximately five degrees either side of the respective center-lines 18d, 19d and 34d, there will be no change in the respective, desired positions of arm 24 because the radius of groove 26 is constant for 12° either side of the center-line 19d of the intermediate position, and is constant for 22½° either side of the respective center-lines 18d and 34d of the two outside or end positions.

To switch in the antenna connected at 18, switch arm 31' is moved over contact 18a and is then pressed into engagement with the latter to apply electrical power at point 18b. Movement of arm 31' over contact 19a and subsequent engagement with the latter, causes application of electrical power at point 19b to switch in the antenna connected at 19. To switch in the third antenna mentioned before, arm 31' is moved over contact 34a and is then pressed into engagement with the latter to apply electrical power at point 34b.

In the following explanation of the operating action reference will be confined to Fig. 5, and the three effective positions for the antenna switch box 16 will be referred to as the points 18b, 19b and 34b, respectively, on terminal strip 33.

In switching from point 19b to point 34b, the operating current or power passes from point 34b to contact 29a and thence to contact 36' and motor 23. It is important to note that always at point 34b and only at this point, contact 30b of microswitch 30 is engaged under control of cam surface 14b. This action provides for excitation of coil 36a and reversal of motor 23 by the polarity-changing relay 36.

In switching from point 34b back to point 19b, current passes from point 19b to contact 28a, to contact 30b and solenoid 36a, to contact 36", and to motor 23.

In switching from point 34b to point 18b, current passes from point 18b to contact 27a, to solenoid 36a and contact 36", and to motor 23.

In switching from point 18b to point 19b, current passes from point 19b to contact 28a, to contact 30a, to contact 36', and to motor 23.

In switching from point 18b to point 34b, current passes from point 34b to contact 29a, to contact 36', and to motor 23.

In switching from point 19b to point 18b, current passes from point 18b to contact 27a, to solenoid 36a and contact 36", and to motor 23.

It will be observed that with the antenna switch at the intermediate point 19b, the direction of motor 23 will be determined according to whether point 34b or point 18b is selected next. If point 34b is selected, current passes from the same directly to motor 23 by way of contacts 29a and 36'. If point 18b is selected, current passes from the same to contact 27a and solenoid 36a for reversal of motor 23, and to contact 36" and the motor.

Another cam, driven by motor 23, may be arranged to actuate additional microswitches whose function would be to effect disconnection of the antenna transmitter while the antenna switch is being turned from one position to another. This would not necessitate the use of additional leads between the drive unit and the remote control therefor. Another method or means, for the same purpose, is shown in Fig. 5. This resides in a conventional relay represented at 37 and connected in series with motor 23. Relay 37 is spring-biased to open position, as indicated, and is closed while power is applied to the motor in changing from any switch position to any other switch position. As will be apparent to those skilled in the art, relay 37 may be made to control any suitable device or auxiliary mechanism which functions to disconnect the antenna switch simultaneously with operation of the motor and to connect this switch in again when power to the motor is shut off.

For more detailed information on the construction of cam 14 or any other cams which might be required, reference is made to the book entitled Cams by Franklin De Ronde Furman, M. E., published 1921 by John Wiley & Sons, Inc., New York, N. Y.

The power supply 32 for motor 23 and relays 35 and 36 may be in the form of a relatively small unit built into the remote-control box for the selector switch 31.

As shown in Fig. 5, for the particular assembly embodying the present invention, only four leads are required between the control box at 31 and the drive unit shown in Fig. 1. It is contemplated to select for motor 23 one of such power and speed, and to use such ratio of gear 21 to pinion 22, that the time required for any switching operation will be approximately one and one-half seconds.

From the foregoing it will be seen that in the improved antenna switching apparatus the coaxial cam drive 10 is capable of changing the position of the switching element in switch 16 to any one of a plurality of radial locations, that the time required for any switching operation need be only about one and one-half seconds, and that at all radial locations the switching element is accurately positioned to within .002 of an inch.

Use of the improved control system and the cam drive 10 forming part thereof is not limited for driving or causing switching operations of an antenna switch. For example, the drive shaft 20 in Fig. 1 may lead or be connected to any mechanical or electrical device or apparatus wherein it is required that an element, rotor or other part be moved to any selected one of a number of different positions.

Although but one embodiment of the invention has been shown and described, it will be understood by those skilled in the art that various modifications such as in the size, shape and arrangement of the parts are possible without departing from the spirit of the invention or the scope of the claims.

What is claimed is:

1. In combination, a cam rotatable about a first point and having a generally spiral slot therein, said slot including at least one substantial portion having a constant radius with respect to said first point, follower means having its one end disposed within said slot and having its other end rotatable about a second point, positioning means rotatable about said second point and attached to said other end of said follower means, said positioning means having at least one given angular position, motor means for rotating said cam about said first point, said slot in said cam thereby moving the one end of said follower means and causing the other end of said follower means to rotate about said second point and rotate said positioning means, said positioning means arriving at its one given angular position when the one end of said follower means enters the constant radius portion of the cam slot, and means cooperating with said cam for disabling said motor means when the one end of said follower means enters the constant radius portion of the slot in said cam so that any further rotation of said motor means has no further effect upon the angular position of said positioning means due to the constant radius portion of the cam slot which imparts no further rotational movement to said follower means.

2. In combination, a cam rotatable about a first point and having a generally spiral slot therein, said slot including a plurality of substantial portions, each of which has a different but constant radius with respect to said first point, a follower arm having its one end disposed within said slot and having its other end rotatable about a second point, an antenna switching device rotatable about said second point and attached to the other end of said follower arm, said antenna switching device having an equal plurality of given angular switch positions, each of said positions respectively corresponding to a constant radius slot portion, motor means for rotating said cam about said first point, said slot in said cam thereby moving the one end of said follower arm and causing the other end of said follower arm to rotate about said second point and rotate said antenna switching device, said antenna switching device arriving at one of its plurality of given angular positions when the one end of said follower arm enters the corresponding constant radius portion of said cam slot, and means cooperatig with said cam for disabling said motor means when the one end of said follower arm enters one of said plurality of constant radius portions of the slot in said cam so that any further rotation of said motor means has no effect on the angular position of said antenna switching device due to the constant radius portion of the cam slot which imparts no further rotational movement to said follower arm.

References Cited in the file of this patent

UNITED STATES PATENTS

| | | |
|---|---|---|
| 2,307,204 | Ehrlich | Jan. 5, 1943 |
| 2,445,223 | Kieffer | July 13, 1948 |
| 2,494,486 | Peterson | Jan. 10, 1950 |
| 2,565,334 | Weingarden | Aug. 21, 1951 |
| 2,627,593 | Tietig | Feb. 3, 1953 |